United States Patent [19]

Lange

[11] 4,101,915
[45] Jul. 18, 1978

[54] GEARING FOR CAMERA OPERATION

[75] Inventor: Karl Heinz Lange, Bunde, Fed. Rep. of Germany

[73] Assignee: Balda-Werke, Bunde, Fed. Rep. of Germany

[21] Appl. No.: 832,302

[22] Filed: Sep. 12, 1977

Related U.S. Application Data

[63] Continuation-in-part of Ser. No. 612,997, Sep. 1, 1975, abandoned.

[30] Foreign Application Priority Data

Sep. 26, 1974 [DE] Fed. Rep. of Germany ....... 2446068

[51] Int. Cl.² .................... G03B 15/03; G03B 17/42; F16H 1/28
[52] U.S. Cl. .................................. 354/144; 354/204; 354/213; 74/801
[58] Field of Search ................... 74/421 R, 436, 820, 74/750 R, 801; 354/148, 204, 213, 144

[56] References Cited

U.S. PATENT DOCUMENTS

| 3,498,571 | 3/1970 | Dilling et al. | 74/750 R X |
| 3,717,079 | 2/1973 | Lange | 354/204 X |
| 3,825,939 | 7/1974 | Engelsmann et al. | 354/204 X |
| 3,829,875 | 8/1974 | Winkler et al. | 354/204 X |
| 3,913,114 | 10/1975 | Taguchi et al. | 354/204 |
| 3,948,456 | 4/1976 | Shimizu | 74/801 X |

*Primary Examiner*—Samuel Scott
*Assistant Examiner*—Lance W. Chandler
*Attorney, Agent, or Firm*—Blum, Moscovitz, Friedman & Kaplan

[57] ABSTRACT

A novel gear arrangement is provided for coordinately performing two or more functions such as winding a film load within a camera, resetting the shutter thereof and setting the flash cube assembly therein. To effect these functions, an internal gear is provided having an internal annular area provided with gear teeth and an internal annular area free from gear teeth. Operatively connected to the internal gear are a plurality of planetary gears, each having an annular external area of gear teeth and an external annular area free of gear teeth, the respective gear teeth areas being in meshing engagement and the respective areas free of gear teeth being in facing relation. The internal gear is provided with a partially milled or corrugated exterior edge mounted through the camera housing. Rotatably connected to the planetary gears is a planetary carrier provided with at least one, and preferably two, sets of function driving gear teeth. Operatively connected to the planetary gears is a sun wheel provided with a set of gear teeth engaging said planetary gear teeth and a further set of function driving gear teeth. The sun wheel and planetary carrier are rotatably connected on a stationary shaft. As the milled edge of the internal gear is rotated, the function driving gear teeth are respectively displaced to effect functions in the camera.

10 Claims, 5 Drawing Figures

GEARING FOR CAMERA OPERATION

CROSS-REFERENCE TO RELATED APPLICATIONS

This is a continuation-in-part application of my co-pending application Ser. No. 612,997 filed Sept. 1, 1975 now abandoned.

BACKGROUND OF THE INVENTION

The instant invention relates to a device coordinately driving the film transport assembly of a camera, resetting the shutter release assembly thereof is being reset and the flash cube assembly is being set. More particularly, the instant invention relates to a novel planetary gear system which translates energy applied thereto into moments for winding a film load in the camera, for resetting the camera shutter release and for setting the flash cube position.

In conventional gearing for winding a film load, resetting a camera shutter and setting a flash cube assembly, the sun wheel, planetary carrier and internal gear are coaxially arranged. However, the sun wheel axis is substantially extended and the planetary carrier is separately discretely housed. These prior types of gear arrangements require very fine gear tolerances, precision mounting of the gears and the inclusion of sprocket wheels for gear interaction.

Additionally, these prior types of gearing arrangement include large bearing surfaces which increase functional resistance among the gears. Also these prior types of gear arrangements are bulky and inopposite for compact or miniature cameras.

Accordingly, the instant invention provides means for overcoming these and other disadvantages of the prior gear arrangements. The means provided by the instant invention is moreover particularly suited for use in compact cameras.

SUMMARY OF THE INVENTION

Generally speaking, in accordance with the instant invention, a novel gear arrangement is provided for coordinately performing two or more functions such as winding a film load within a camera, resetting the shutter thereof and setting the flash cube assembly therein. To effect these functions, an internal gear is provided having an internal annular area provided with gear teeth and an internal annular shoulder free from gear teeth. Operatively connected to the internal gear are a plurality of planetary gears, each having an annular external area of gear teeth and an external annular shoulder free of gear teeth, the respective gear teeth areas being in meshing engagement and the respective areas free of gear teeth being in facing relation. The internal gear is provided with a partially milled or corrugated exterior edge mounted through the camera housing.

Rotatably connected to the planetary gears is a planetary carrier provided with at least one, and preferably two, sets of function driving gear teeth. Operatively connected to the planetary gears is a sun wheel provided with a set of gear teeth engaging said planetary gear teeth and a further set of function driving gear teeth. The sun wheel and planetary carrier are rotatably connected on a stationary shaft. As the milled edge of the internal gear is rotated, the function driving gear teeth are respectively displaced to effect functions in the camera.

Accordingly, it is an object of the invention to provide a novel gearing arrangement for driving the film transport assembly in a camera resetting the shutter release assembly thereof and resetting the flash cube assembly thereof.

Another object of the instant invention is to provide gearing for driving the film transport assembly, resetting the shutter release assembly, and setting the flash cube assembly of a camera which is particularly suited for compact and miniature cameras.

Still another object of the invention is to provide gearing for a camera for driving the film transport assembly and shutter release assembly thereof and which is rotatably mounted on a single stationary shaft within the camera housing.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a perspective view of the gearing in accordance with the invention coupled to

DETAILED DESCRIPTION OF THE PREFERRED EMBODIMENTS

Figure 3:
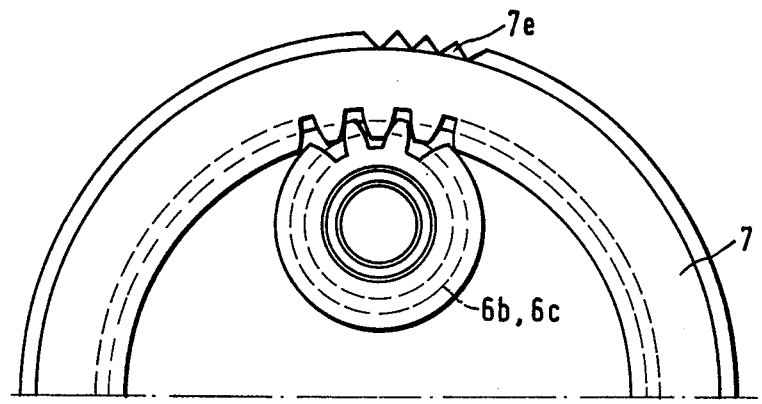
FIG. 3 is a partial top plan view of an internal gear and planetary gear constructed in accordance with the instant invention.

Referring now to the drawings, a system of three planetary gears 6 is mounted within an internal gear 7. Each planetary gear 6 is provided with a continuous circumferential array of gear teeth 6a which mesh with a corresponding plurality of gear teeth 7a provided in internal gear 7. The construction of the planetary gears is identical and a description of one provides a description for all. Planetary gear 6 is journaled on a trunnion 5 mounted in a planetary carrier 3. A sun wheel 4 includes a plurality of gear teeth 4a also in mesh with gear teeth 6a of planetary gear 6. Planetary carrier 3 and sun wheel 4 are rotatably journaled on opposite ends of a stationary shaft 2.

A collar 5a surrounds the upper portion of trunnion 5 and guard member 8 is journaled on the free end of trunnion 5. Planetary gear 6 is mounted on trunnion 5 between collar 5a and guard member 8 and planetary gear 6 is thereby not axially displaceable on trunnion 5.

The gear assembly is adapted for mounting within a camera housing, the housing being provided with a slot through which a milled edge 7e of internal gear 7 protrudes. When the milled edge of internal gear 7 is rotated, planetary gears 6 rotate on trunnions 5 with the result that planetary carrier 3 and sun wheel 4 revolve about stationary shaft 2. Planetary carrier 3 is provided with respective pluralities of function driving gear teeth 3a and 3b arranged to mesh with respective corresponding pluralities of gear teeth provided in the shutter drive assembly and flash cube drive assembly of the camera as will be more particularly described below. A plurality of function driving gear teeth 4c provided in sun wheel 4 may be arranged to mesh with the film winding assembly in the camera. As planetary carrier 3 and sun wheel 4 are rotated, the camera shutter, flash cube and film winding assemblies mounted within the camera housing are coordinately driven, as more particularly described below.

The gear assembly within the scope of the instant invention may be employed in conventional compact shutter cameras having conventional shutter, film winding, and flash cube assemblies. If necessary, however, the conventional shutter, film winding and flash cube assemblies may be modified to include means, such as a star gear, which cooperates with the gearing of the instant invention.

Planetary gear 6 is mounted in gear 7 so that respective planes 6d and 7d thereof are a distance from each other. As a result of the separation between respective planes 6d and 7d, the respective interior surfaces 6g and 7g of gears 6 and 7 lying in planes 6d and 7d, respectively, do not engage each other.

Gear teeth 6a occupy only a continuous portion of the circumference of planetary gear 6, while the remainder of the circumference of planetary gear 6 has a continuous non-toothed surface 6b. The diameter 6c of the section of planetary gear 6 provided with non-toothed surface 6b is greater than the minor diameter of gear 6, but lesser than the major diameter of gear 6. The major and minor diameters of gear 6 correspond respectively to the locations of the top and bottom lands determined by gear teeth 6a.

Likewise, gear teeth 7a in internal gear 7 occupy only a continuous portion of the interior circumference of gear 7, while the remainder of the interior circumference of gear 7 comprises a continuous annular portion having a non-toothed surface. The diameter 7c of non-toothed portion 7b in gear 7 is less than the minor diameter of gear 7 and greater than the major diameter of gear 7. The major and minor diameters of gear 7 correspond to the top and bottom lands determined by gear teeth 7a.

The width 6e of gear teeth 6a of planetary gear 6 is greater than the corresponding width 4b of gear teeth 4a in sun wheel 4. As may be seen with reference to FIG. 1, the plane of separation 6d between the non-toothed surface 6b and gear teeth 6a in planetary gear 6 is located above the upper edge of gear teeth 4a in sun wheel 4 in the assembled gearing. Likewise, the outer edge of gear teeth 6a parallel to plane 6d of planetary gear 6 is located above the corresponding outer edge of gear teeth 4a. As may be seen in FIG. 1, the corresponding inner and outer edges of gear teeth 4a and 6a are parallel and respective gears 4 and 6 are arranged so that the corresponding top lands of each gear do not engage the corresponding bottom land of the gear with which it meshes. Therefore, as gears 4 and 6 mesh, only the sidewalls between their top and bottom lands engage.

Figure 2:
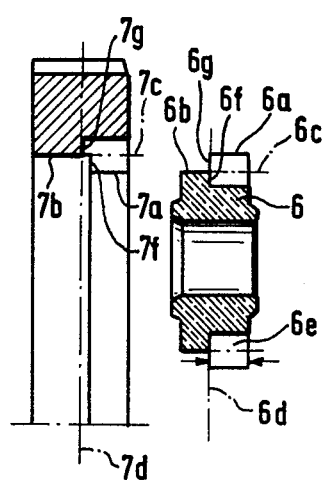
FIG. 2 is an exploded view showing the internal gear and a planetary gear of the type operatively connected thereto, the gears having been constructed in accordance with the instant invention.
Figure 1:
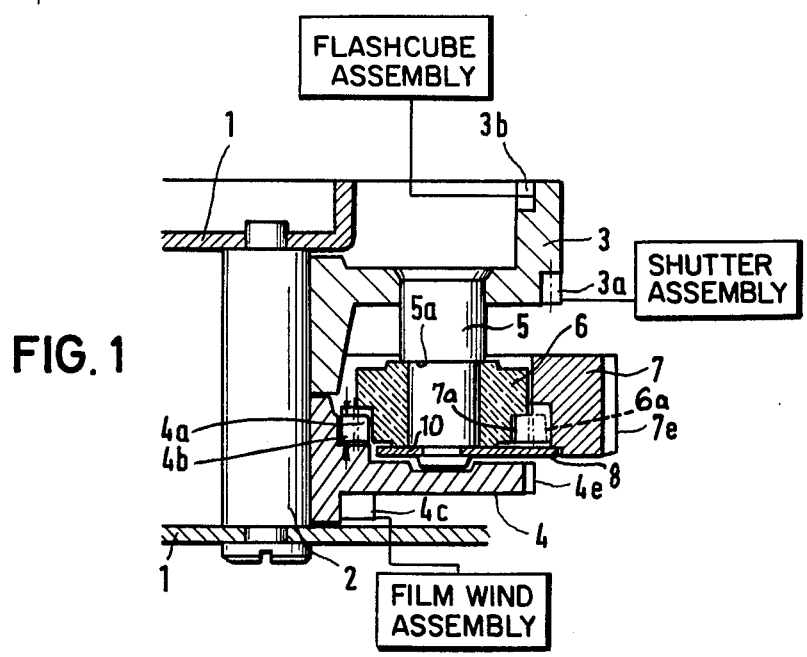
FIG. 1 is a section through gearing constructed in accordance with the instant invention.
Figure 4:
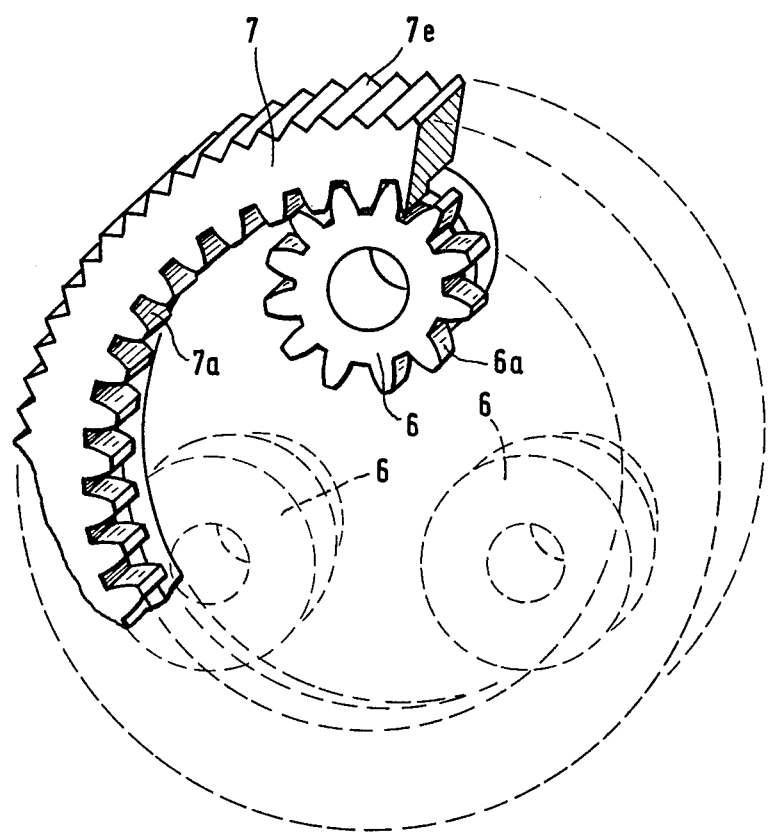
FIG. 4 is a perspective view of an internal gear and three planetary gears in mesh therewith, the gears having been constructed in accordance with the instant invention.

As may be seen in FIG. 2, when planetary gears 6 are assembled in internal gear 7, respective surfaces 6f and 7f thereof abut. However, respective surfaces 6g and 7g thereof which are located in respective planes of separation 6d and 7d do not abut. Each planetary gear 6 has a plate 10 mounted beneath it which extends beyond the periphery of its gear teeth and locates internal gear 7 by means of a peripheral notch 11 cut into the underside of internal gear 7. Plate 10 locates internal gear 7 against any movement in a direction away from planetary carrier 3, as seen in FIG. 1 and the abutment of surfaces 6f and 7f locate internal gear 7 against any movement in the opposite direction.

Figure 5:
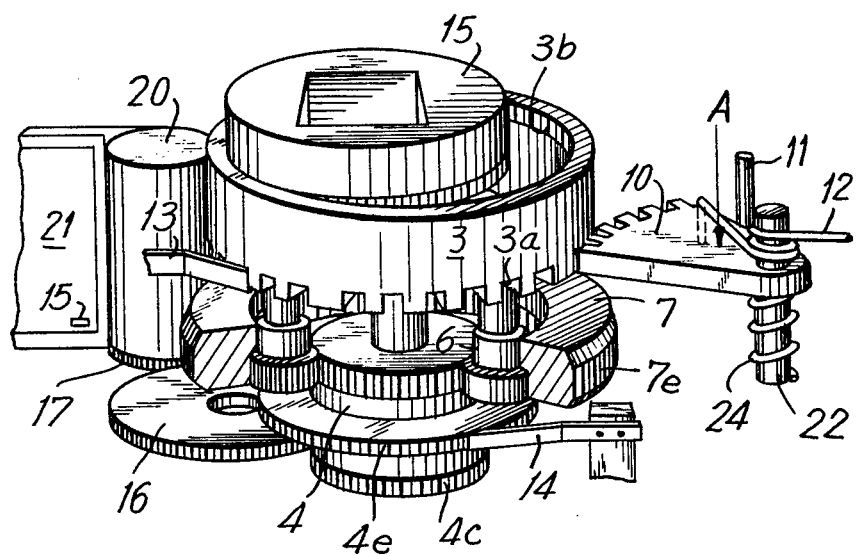

Referring now to FIG. 5, internal gear 7 projects outside of the camera housing and when manually turned in the counter-clockwise direction, as viewed from above in FIG. 5, planetary carrier 3 is caused to turn in said counter-clockwise direction. Gear teeth 3a in planetary carrier 3 engage the toothed segment 10, forcing said toothed segment 10 to rotate against the bias of spring 12 about post 22 until toothed segment 10 engages stop pin 11. The rotation of planetary carrier 3 also rotates the flash cube socket 15 through 90° by the cooperation of gear teeth 3b on planetary carrier 3 and corresponding teeth on the flash cube socket 15. A ratchet and pawl in the form of gear teeth 3a and leaf spring 13 prevents return motion, said pawl being secured to a fixed portion of the camera (not shown) such as the camera housing.

When planetary carrier 3 is stopped, the continued rotation of internal gear 7 causes planetary gears 6 to rotate, which in turn drive sun wheel 4 to rotate in the clockwise direction as viewed from above in FIG. 5. This rotation is transferred via gear teeth 4c and transfer gear 16 to the gear 17 on the take-up spool of the film cartridge 20. The film is wound until a feeler (not shown) drops into the perforation 15 blocking thereby further movement of the gear train in a well known manner. Pawl 14, which is also mounted on a fixed portion of the camera, prevents return motion of the sun wheel and gears by engagement against gear teeth 4e on sun wheel 4.

Depression of the shutter release button (not shown) moves toothed segment 10 downwardly along post 22 against the action of spring 24 as indicated by arrow A. When the teeth of segment 10 disengage from teeth 3a of planetary carrier 3, the segment is urged in the counter clockwise direction as viewed in the annexed figure by spring 12. The leading edge of toothed segment 10 operates the shutter (not shown) in a well known manner and frees the gear train for the next film transport. In its most forward position, segment 10 is free to rise under the influence of spring 24 and re-engage teeth 3a of the planetary carrier 3. The entire operation can then be repeated.

The gear assembly of the instant invention is extremely versatile and conventional shutter, flash cube and film winding assemblies may be employed in conjunction therewith. The shutter, flash cube and film winding assemblies for the camera may be variously located within the camera housing, as desired, and it is only necessary that each of these assemblies be provided with an associated star gear through which the gearing assembly in accordance with the invention can transmit a driving moment.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A gear assembly for a camera adapted to coordinately perform at least two functions in said camera comprising an internal gear, a plurality of planetary gears in mesh with said internal gear, a planetary gear carrier, said plurality of planetary gears being rotatably mounted on said planetary gear carrier, a sun wheel operatively connected to said plurality of planetary gears, a stationary shaft, said planetary gear carrier and said sun wheel being rotatably mounted on said stationary shaft, means for rotating said internal gear, said planetary gear carrier being rotated about said stationary shaft as said internal gear is rotated, a first set of gear teeth on said planetary carrier for performing a first function, and a second set of gear teeth on said planetary carrier for performing a second function.

2. The gear assembly as claimed in claim 1, wherein said internal gear rotating means are manually operable.

3. The gear assembly as claimed in claim 2, wherein said manually operated means comprise a milled edge disposed on said internal gear and said milled edge extending through said camera.

4. The gear assembly as claimed in claim 1, wherein said sun wheel includes means for performing a third function.

5. The gear assembly as claimed in claim 4, wherein said third function comprises driving a film transport assembly.

6. The gear assembly as claimed in claim 1, wherein said first and second functions include setting a shutter assembly and rotating a flash cube assembly.

7. The gear assembly as claimed in claim 1, wherein said internal gear is an annular area provided with a plurality of gear teeth and an annular area having a non-toothed shoulder, said plurality of planetary gears having corresponding annular areas provided with gear teeth and corresponding annular areas having non-toothed shoulders.

8. The gear assembly as claimed in claim 7, wherein said non-toothed shoulders have a diameter intermediate the major and minor diameters of their respective gear teeth.

9. The gear assembly as claimed in claim 8, wherein said teeth of each said planetary gears define a first side facing said shoulder of said planetary gear and a second side facing away from said shoulder of said planetary gear, said internal gear teeth defining a first side facing said shoulder of said internal gear and a second side facing away from said shoulder of said internal gear, said shoulder of said internal gear defining an inner edge facing and offset from said first side of said teeth of said internal gear, said shoulder of each of said planetary gears having an inner edge in registration with said first side of said teeth of said planetary gear to define a radially extending annular wall between said shoulder and the minor diameter of said planetary gear teeth, said annular wall of each of said planetary gears abutting said first side of said teeth of said internal gear, whereby radial planes passing through the respective inner shoulder edges of said planetary and interior gears are axially spaced.

10. The gear assembly as claimed in claim 9, further including a plate mounted proximate to said second side edge of each said planetary gear, said internal gear having an internal peripheral notch proximate to said second side of said teeth of said internal gear, said plate being positioned for engagement in said peripheral notch for at least in part supporting said internal gear.

* * * * *